(12) United States Patent
Chou et al.

(10) Patent No.: US 8,018,550 B2
(45) Date of Patent: Sep. 13, 2011

(54) LIQUID CRYSTAL DISPLAY

(75) Inventors: Chia-Shin Chou, Taipei Hsien (TW); Zhen-Xing Ye, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

(*) Notice: Subject to any disclaimer, the term of this patent is extended or adjusted under 35 U.S.C. 154(b) by 247 days.

(21) Appl. No.: 12/549,379

(22) Filed: Aug. 28, 2009

(65) Prior Publication Data
US 2011/0019120 A1    Jan. 27, 2011

(30) Foreign Application Priority Data

Jul. 24, 2009   (CN) .......................... 2009 1 0304792

(51) Int. Cl.
G02F 1/1333   (2006.01)
(52) U.S. Cl. .......................................... 349/58; 349/56
(58) Field of Classification Search .................. 349/56, 349/58, 60, 61
See application file for complete search history.

(56) References Cited

U.S. PATENT DOCUMENTS

| | | | | |
|---|---|---|---|---|
| 6,989,985 | B2 * | 1/2006 | Tanimoto et al. | 361/679.06 |
| 7,063,295 | B2 * | 6/2006 | Kwon | 248/276.1 |
| 7,798,460 | B2 * | 9/2010 | Park | 248/324 |
| 2004/0105227 | A1 * | 6/2004 | Tanimoto et al. | 361/683 |
| 2005/0002159 | A1 * | 1/2005 | Jeong | 361/683 |
| 2005/0152102 | A1 * | 7/2005 | Shin | 361/681 |
| 2008/0011927 | A1 * | 1/2008 | Park | 248/324 |
| 2009/0166502 | A1 * | 7/2009 | Wang et al. | 248/423 |
| 2011/0019120 | A1 * | 1/2011 | Chou et al. | 349/58 |

* cited by examiner

Primary Examiner — Brian M. Healy
(74) Attorney, Agent, or Firm — Altis Law Group, Inc.

(57) ABSTRACT

A liquid crystal display can be adjusted to a desired viewing angle easily. A display screen of the liquid crystal display can be adjusted to the desired viewing angle thereby to drive a fixing portion of a bracket, a rotating portion of an operating member or a securing portion of an adjusting member to rotate correspondingly.

14 Claims, 5 Drawing Sheets

LIQUID CRYSTAL DISPLAY

BACKGROUND

1. Technical Field

The present disclosure relates to liquid crystal displays (LCDs), and particularly to an LCD whose viewing angle is freely adjustable.

2. Description of Related Art

Desktop computers have become increasingly popular for general use. When a desktop computer is being used, a supporter is generally mounted to a bottom of an LCD of the desktop computer to support the LCD, and the supporter and a keyboard of the desktop computer are supported on a desk surface. However, the LCD is usually retained in a predetermined position and an angle between the LCD and the supporter of the LCD is difficult to adjust.

DETAILED DESCRIPTION

Figure 1:
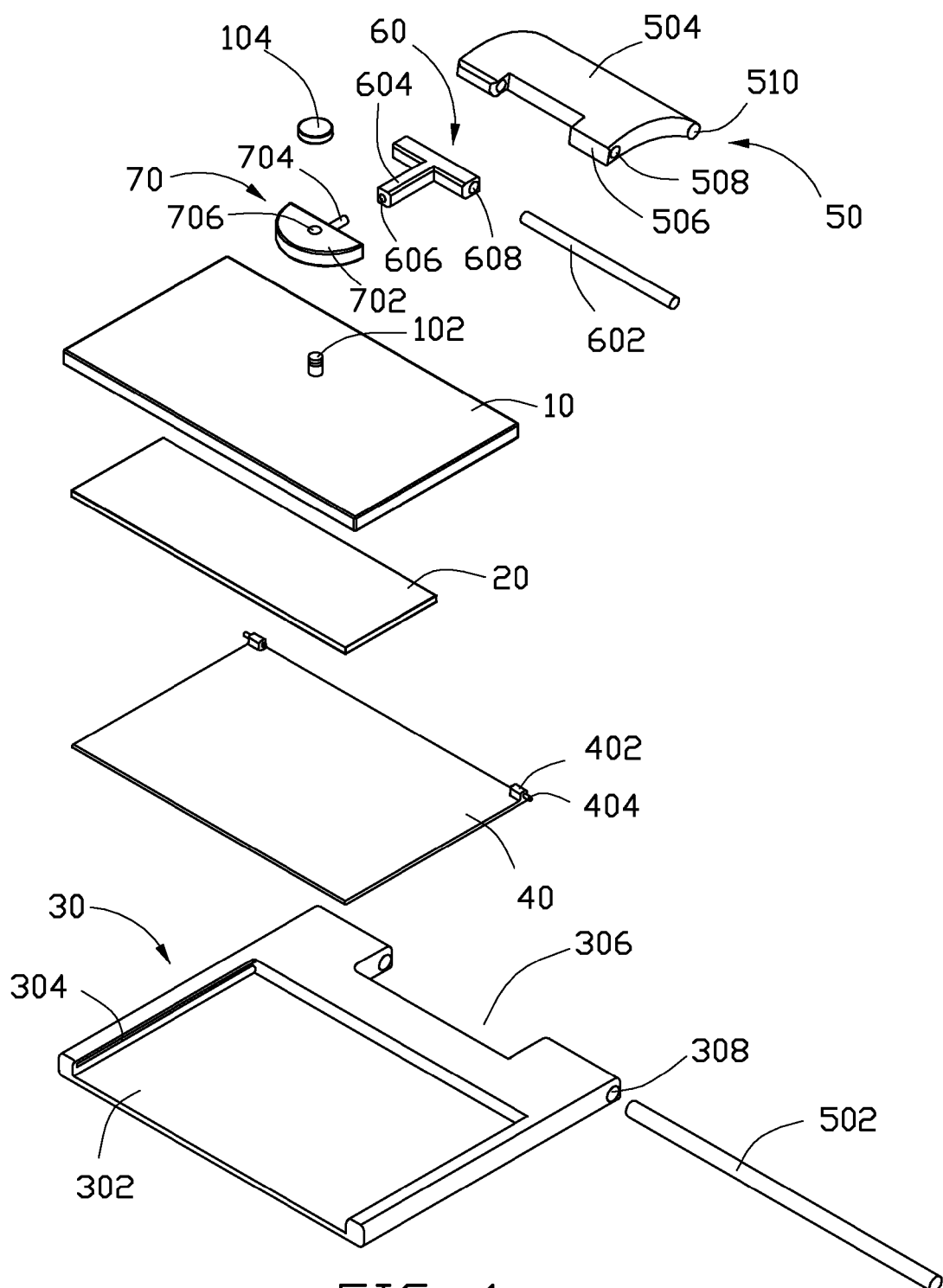
FIG. 1 is an exploded, isometric view of an exemplary embodiment of a liquid crystal display (LCD), together with a keyboard.

Referring to FIG. 1, a first exemplary embodiment of a liquid crystal display (LCD) includes a display screen 10, a base 30, a supporting panel 40, a bracket 50, an operating member 60, and an adjusting member 70.

The display screen 10 is substantially rectangular-shaped. A substantially cylindrical-shaped fixing member 102, such as a threaded post, extends from a center of a back of the display screen 10.

A recess 302 is defined in a top of the base 30, adjacent to a front side of the base 30. Two slots 304 are defined in opposite sidewalls of the recess 302 respectively. An opening 306 is defined in the top of the base 30, at a rear side of the base 30 and extends through a bottom of the base 30. A mounting hole 308 is traversely defined in the rear side of the base 30, extending through opposite sidewalls of the base 30 and communicating with the opening 306.

The supporting panel 40 is substantially rectangular-shaped. Two protrusions 402 are formed on opposite ends of a rear side of a top of the supporting panel 40 respectively. A post 404 extends out from an outer end of each protrusion 402.

The bracket 50 includes a shaft 502, and a substantially arc-shaped fixing portion 504. A pivot hole 510 is traversely defined in a bottom side of the fixing portion 504 for the shaft 502 pivotably passing therethrough. Two connection portions 506 extend from opposite ends of a top side of the fixing portion 504. A pivot hole 508 is traversely defined in the top side of the fixing portion 504 through the connection portions 506.

The operating member 60 includes a shaft 602 and a substantially T-shaped rotating portion 604. A locking hole 606 is defined in a top end of the rotating portion 604. A pivot hole 608 is defined in a bottom of the rotating portion 604, perpendicular to the locking hole 606 for the shaft 602 pivotably passing through.

The adjusting member 70 includes a substantially semicircular-shaped securing portion 702 and a fastening pole 704 extending from a diameter side of the securing portion 702. A through hole 706 is defined in the securing portion 702, through a top and a bottom of the securing portion 702.

Figure 2:
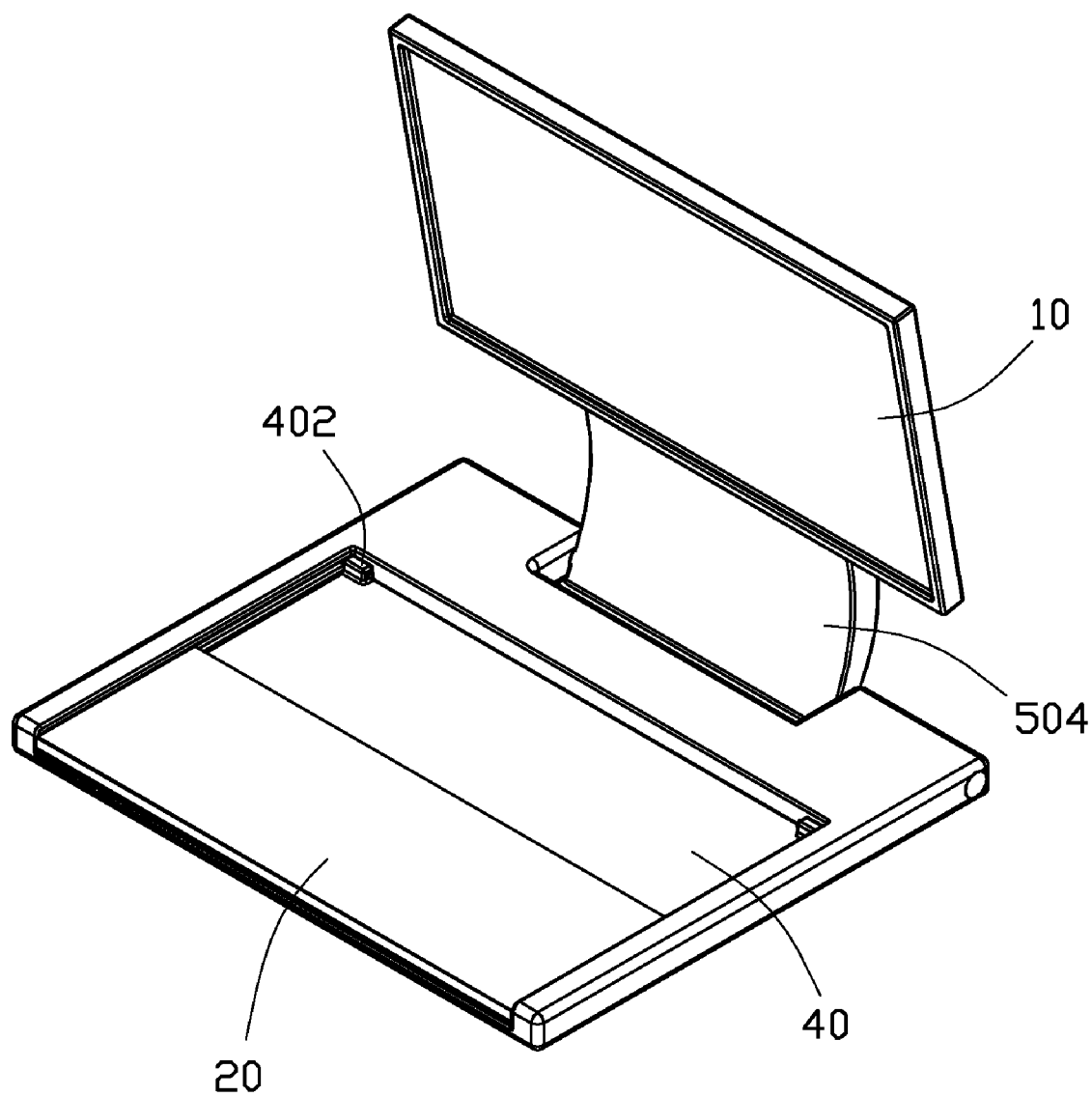
FIG. 2 is an assembled, isometric view of the LCD and the keyboard of FIG. 1.

Referring to FIG. 2, in assembly, the posts 404 of the supporting panel 40 are slidably received in the corresponding slots 304 of the base 30, with the outer ends of the protrusions 402 resisting against the corresponding sidewalls of the recess 302, to mount the supporting panel 40 to the base 30. The bottom side of the fixing portion 504 of the bracket 50 is received in the opening 306 of the base 30. The shaft 502 of the bracket 50 passes through the mounting hole 308 of the base 30 and the pivot hole 510 of the fixing portion 504, to pivotably mount the bracket 50 to the base 30. The bottom of the rotating portion 604 of the operating member 60 is accommodated between the connection portions 506 of the bracket 50. The shaft 602 of the operating member 60 passes through the pivot hole 508 of the bracket 50 and the pivot hole 608 of the rotating portion 604, to pivotably mount the operating member 60 to the bracket 50. The fastening pole 704 of the adjusting member 70 is rotatably inserted into the locking hole 606 of the operating member 60, to rotatably mount the adjusting member 70 to the operating member 60. The fixing member 102 of the display screen 10 passes through the through hole 706 of the adjusting member 70, with a threaded portion of the fixing member 102 extending out through the adjusting member 70. A fastener 104 is screwed to the threaded portion of the fixing member 102, to mount the adjusting member 70 to the display screen 10. A keyboard 20 is placed on the supporting panel 40. Because the fixing portion 504 of the bracket 50 can rotate around the shaft 502, the rotating portion 604 of the operating member 60 can rotate around the shaft 602, and the securing portion 702 of the adjusting member 70 can rotate around the fastening pole 704, thus the display screen 10 can be adjusted to desired viewing angles. An operator can also push the supporting panel 40 to drive the posts 404 of the supporting panel 40 to slide in the corresponding slot 304 of the base 30, thereby positions of the keyboard 20 can be adjusted according to requirements.

Figure 3:
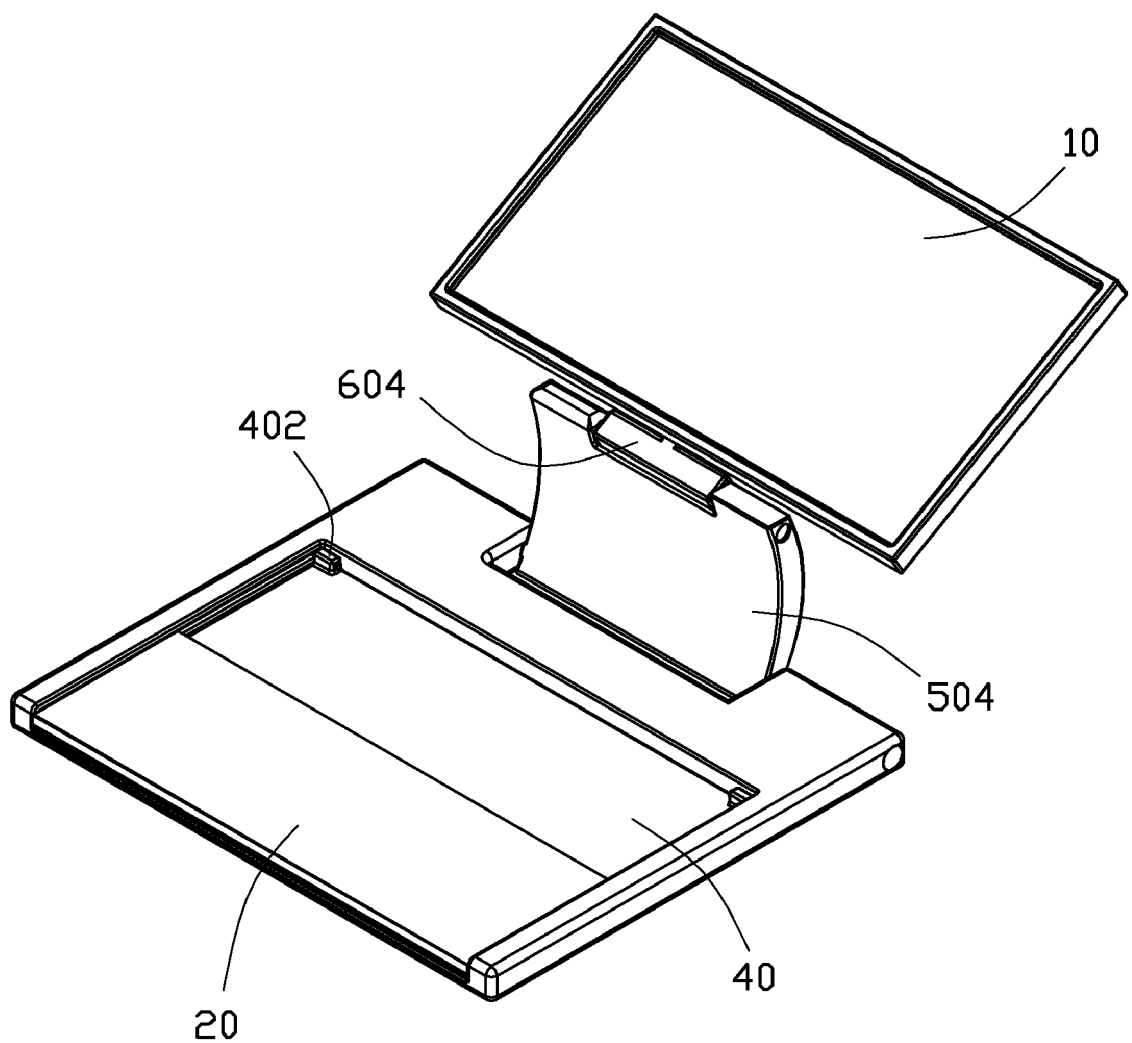
FIG. 3 is similar to FIG. 2, but showing a first state of the LCD.

Referring to FIG. 3, when the display screen 10 needs to be located at a position inclined to the base 30 at an angle of 135 degrees, the operator adjusts the display screen 10 back to drive the fixing portion 504 of the bracket 50 or the rotating portion 604 of the operating member 60 to rotate back, thereby the display screen 10 can be located as needed.

Figure 4:
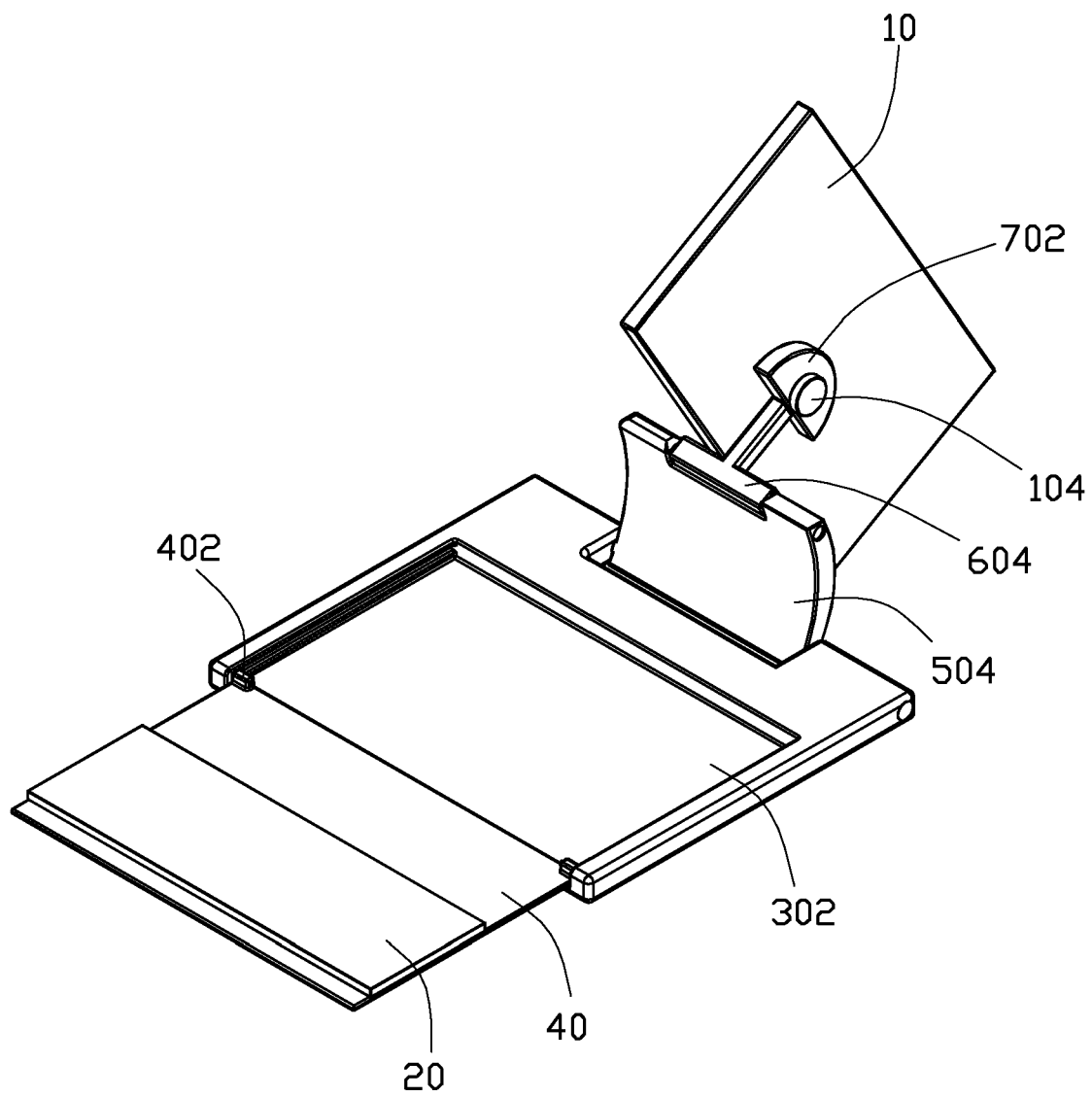
FIG. 4 is similar to FIG. 3, but showing a second state of the LCD.

Referring to FIG. 4, when the display screen 10 needs to face to a left direction of the base 30, and the keyboard 20 needs to be moved away from the base 30, the operator adjusts the display screen 10 to the left direction of the base 30 to drive the securing portion 702 of the adjusting member 70 to rotate to the left direction of the base 3. The supporting panel 40 is pushed to drive the posts 404 of the supporting panel 40 to slide in the slots 304 away from the base 30.

Figure 5:
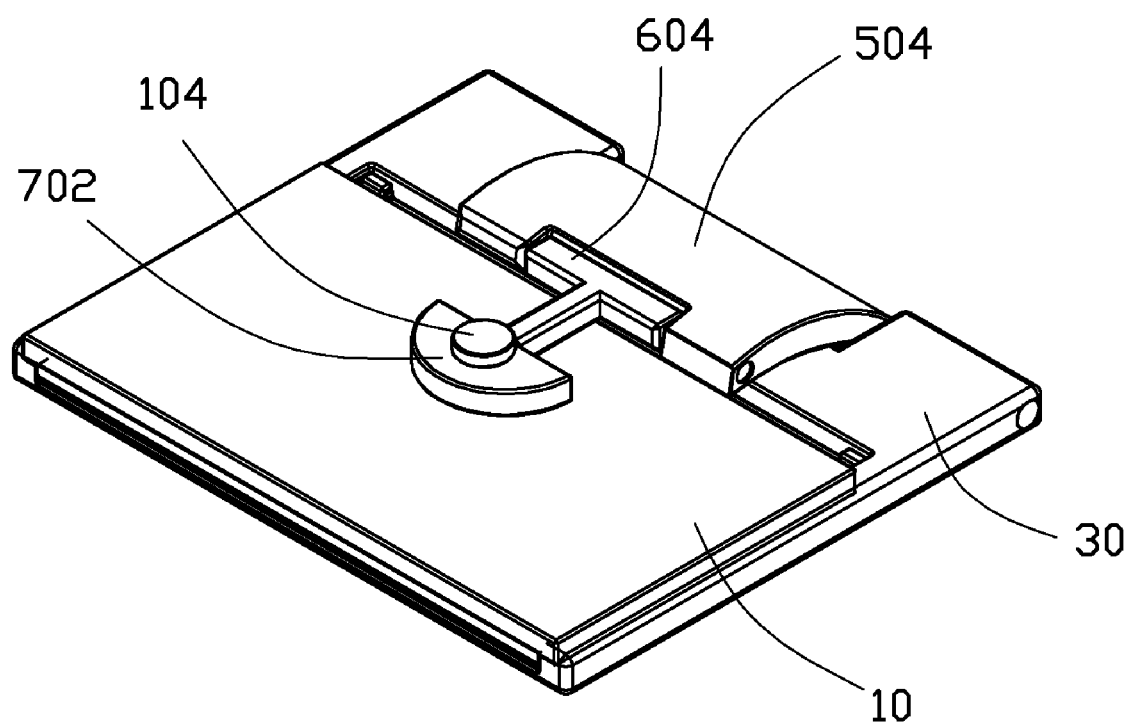
FIG. 5 is similar to FIG. 4, but showing a third state of the LCD.

Referring to FIG. 5, when the display screen 10 and the keyboard 20 are unused, the operator can push the supporting panel 40 to drive the posts 404 of the supporting panel 40 to slide in the slots 304 until the keyboard 20 and the supporting panel 40 are completely received in the recess 302. The display screen 10 is adjusted towards the base 30 to drive the fixing portion 504 of the bracket 50, the rotating portion 604 of the operating member 60, and the securing portion 702 of the adjusting member 70 to rotate towards the base 30, with the display screen 10 resisting against opposite ends of the top of the base 30 and covering the recess 302, thereby protecting the display screen 10 and the keyboard 20 from dust.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. A liquid crystal display (LCD) comprising:
   a base;
   a bracket rotatably mounted to the base, wherein the bracket is operable to rotate around a first shaft;
   an operating member rotatably mounted to the bracket, wherein the operating member is operable to rotate around a second shaft parallel to the first shaft;
   an adjusting member rotatably mounted to the operating member, wherein the adjusting member is operable to rotate around a third shaft perpendicular to the first shaft; and
   a display screen mounted to the adjusting member.

2. The LCD of claim 1, wherein the bracket comprises a fixing portion, the first shaft passes through the base and the fixing portion to rotatably mount the bracket to the base.

3. The LCD of claim 2, wherein a connection portion extends from the fixing portion opposite to the first shaft, a pivot hole is traversely defined in the connection portion, the operating member comprises a rotating portion, the second shaft passes through the pivot hole and the rotating portion of the operating member to rotatably mount the operating member to the bracket.

4. The LCD of claim 3, wherein a locking hole is defined in a top of the rotating portion, the adjusting member comprises a securing portion, the third shaft extends from the securing portion, wherein the third shaft is rotatably inserted into the locking hole of the operating member to rotatably mount the adjusting member to the operating member.

5. The LCD of claim 4, wherein a through hole is defined in the securing portion through a top and a bottom of the securing portion, a fixing member extends from a back of the display screen, the fixing member of the display screen passes through the through hole of the adjusting member to engage with a fastener to mount the adjusting member to the back of the display screen.

6. The LCD of claim 1, further comprising a keyboard, and a supporting panel for mounting the keyboard to the base.

7. The LCD of claim 6, wherein two protrusions are formed on opposite ends of a rear side of the supporting panel, a post extend from an outer end of each protrusion, a recess is defined in a top of the base, two slots are defined in opposite sidewalls of the recess, the keyboard is placed on the supporting panel, and the posts of the supporting panel are slidably received in the corresponding slots.

8. A supporting member for mounting to a display screen, the supporting member comprising:
   a base;
   a bracket rotatably mounted to the base, wherein the bracket is operable of rotating around a first shaft;
   an operating member rotatably mounted to the bracket, wherein the bracket is operable of rotating around a second shaft parallel to the first shaft; and
   an adjusting member to mount the display screen, wherein the adjusting member is operable of rotating around a third shaft perpendicular to the first and second shafts.

9. The supporting member of claim 8, wherein the bracket comprises a fixing portion, and the first shaft passes through the base and the fixing portion to rotatably mount the bracket to the base.

10. The supporting member of claim 9, wherein a connection portion extends from the fixing portion opposite to the first shaft, the operating member comprises a rotating portion, and the second shaft passes through the connection portion and the rotating portion of the operating member to rotatably mount the operating member to the bracket.

11. The supporting member of claim 10, wherein a locking hole is defined in a top end of the rotating portion, the adjusting member comprises a securing portion, the third shaft extends from the securing portion, wherein the third shaft is rotatably inserted into the locking hole of the operating member to mount the adjusting member to the operating member.

12. The supporting member of claim 11, wherein a fixing member extends from a back of the display screen, the fixing member passes through the securing portion of the adjusting member to engage with a fastener to fix the display screen to the back of the adjusting member.

13. The supporting member of claim 8, further comprising a supporting panel mounted to the base, to support a keyboard.

14. The supporting member of claim 13, wherein two posts extend from opposite ends of the supporting panel, a recess is defined in a top of the base, two slots are defined in opposite sidewalls of the recess, for slidably receiving the corresponding posts.

* * * * *